(12) United States Patent
Mizukoshi et al.

(10) Patent No.: US 7,675,705 B2
(45) Date of Patent: Mar. 9, 2010

(54) METHOD AND APPARATUS FOR WRITING SERVO PATTERN USING SPIRAL PATTERN IN DISK DRIVE

(75) Inventors: Seiji Mizukoshi, Nishitama-gun (JP); Masahide Yatsu, Akishima (JP); Hideo Sado, Ome (JP); Katsuki Ueda, Tachikawa (JP); Toshitaka Matsunaga, Ome (JP); Shinichirou Kouhara, Hino (JP); Shouji Nakajima, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 11/946,384

(22) Filed: Nov. 28, 2007

(65) Prior Publication Data

US 2008/0151413 A1 Jun. 26, 2008

(30) Foreign Application Priority Data

Dec. 26, 2006 (JP) .............................. 2006-350012

(51) Int. Cl.
G11B 20/12 (2006.01)
G11B 21/02 (2006.01)

(52) U.S. Cl. ....................................................... 360/75

(58) Field of Classification Search ........................ None
See application file for complete search history.

(56) References Cited

U.S. PATENT DOCUMENTS 5,477,472 A * 12/1995 Wise et al. .................. 702/126
5,499,236 A * 3/1996 Giallorenzi et al. ......... 370/441
5,668,679 A 9/1997 Swearingen et al.
6,704,156 B1 3/2004 Baker et al.
6,967,799 B1 * 11/2005 Lee .............................. 360/51
7,209,312 B1 * 4/2007 Sutardja ................... 360/77.07
7,230,789 B1 * 6/2007 Brunnett et al. ................ 360/75
7,333,280 B1 * 2/2008 Lifchits et al. ................ 360/75
7,375,918 B1 * 5/2008 Shepherd et al. .......... 360/78.14
7,391,583 B1 * 6/2008 Sheh et al. .................... 360/75
7,468,855 B1 * 12/2008 Weerasooriya et al. ........ 360/75
7,471,481 B2 * 12/2008 Lau et al. ....................... 360/75
7,522,370 B1 * 4/2009 Sutardja ................... 360/77.07
7,561,359 B1 * 7/2009 Jeong et al. .................... 360/48
2007/0263311 A1 * 11/2007 Smith ........................... 360/75
2007/0285822 A1 * 12/2007 Lau .............................. 360/69
2009/0067084 A1 * 3/2009 Lau et al. ....................... 360/75

FOREIGN PATENT DOCUMENTS

JP 62-012970 1/1987
JP 62-033375 2/1987

* cited by examiner

Primary Examiner—Hoa T Nguyen
Assistant Examiner—James L Habermehl
(74) Attorney, Agent, or Firm—Pillsbury Winthrop Shaw Pittman, LLP

(57) ABSTRACT

According to one embodiment, there is provided a servo write method of writing specified servo patterns to a disk medium on the basis of a spiral servo pattern recorded on the disk medium, wherein when the spiral servo pattern is read using a head, position detecting data used to detect a radial position on the disk medium on the basis of data recorded in a sync mark region.

18 Claims, 7 Drawing Sheets

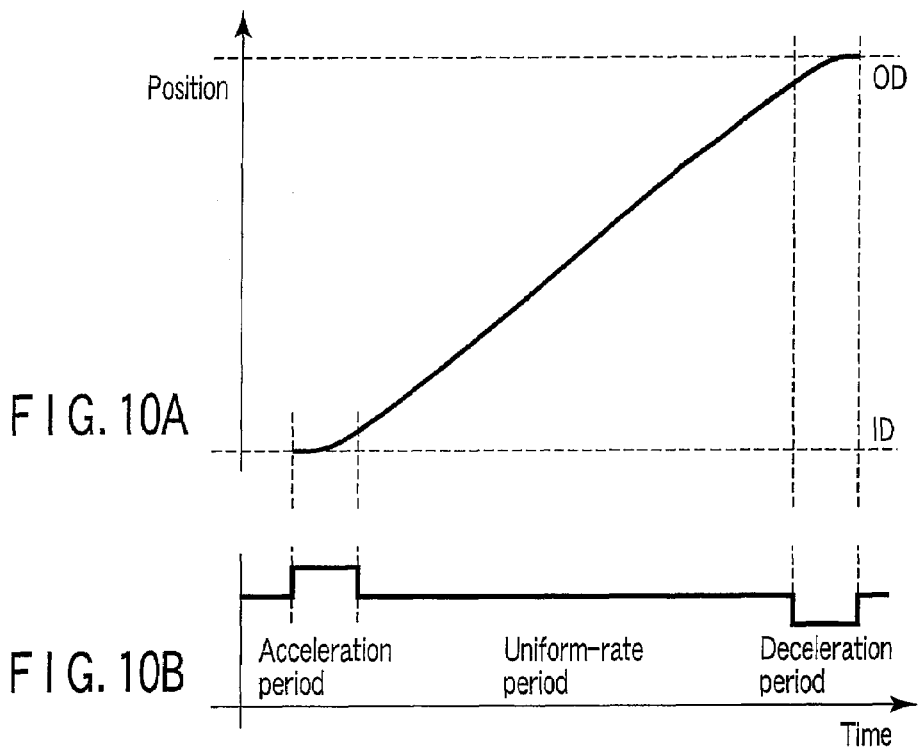
FIG. 10A
FIG. 10B
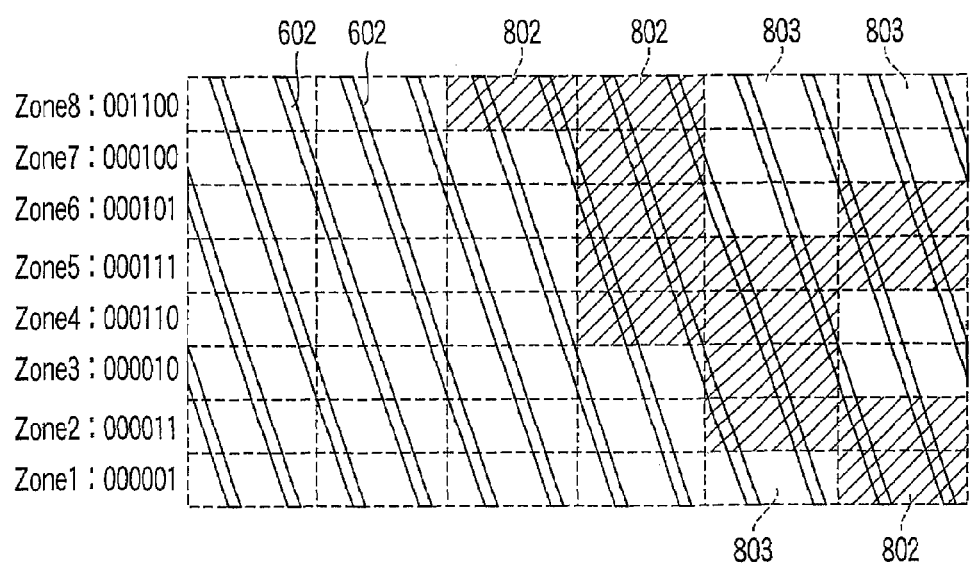
FIG. 11

METHOD AND APPARATUS FOR WRITING SERVO PATTERN USING SPIRAL PATTERN IN DISK DRIVE

CROSS-REFERENCE TO RELATED APPLICATIONS

This application is based upon and claims the benefit of priority from Japanese Patent Application No. 2006-350012, filed Dec. 26, 2006, the entire contents of which are incorporated herein by reference.

BACKGROUND

1. Field

One embodiment of the present invention relates to a disk drive, and in particular, to a servo writing technique using a spiral servo pattern.

2. Description of the Related Art

In general, in disk drives typified by hard disk drives, servo patterns (servo data) used for head positioning control are recorded on a disk medium that is a data recording medium. The disk drive uses the servo patterns read by the head to controllably place the head at a target position (target track) on the disk medium.

The servo patterns recorded on the disk medium have a plurality of servo sectors normally arranged circumferentially at a fixed interval so as to constitute concentric servo tracks. The disk drive positions the head on the basis of the servo patterns and uses the head to record user data on the disk medium to construct concentric data tracks.

The servo patterns are recorded on the disk medium by a servo write step included in a disk drive manufacturing process. A proposal has been made of a method of recording a spiral servo pattern constituting a base pattern on the disk medium during the servo write step (see, for example, U.S. Pat. No. 5,668,679).

In the servo write step in accordance with the proposed method, a spiral servo pattern is recorded, by, for example, a dedicated servo track writer (STW), on the disk medium not incorporated yet into a disk drive to be shipped as a product. Alternatively, a head in the drive itself records the spiral servo pattern.

The disk medium is subsequently incorporated into the disk drive, which performs a servo self-write method to write radial servo patterns (hereinafter referred to as specified servo patterns for convenience) used for the product to the disk medium. The specified servo patterns constitute the concentric servo tracks.

The servo self-write method enables the specified servo patterns to be written to the disk medium while moving the head of the disk drive, for example, from the inner periphery toward outer periphery of the disk medium, using the spiral base pattern pre-recorded on the disk medium as a base pattern.

The servo self-write step writes the specified servo patterns to the disk medium at specified positions by positioning the head of the disk drive on the basis of the spiral servo pattern. Only servo burst signals are recorded in the spiral servo pattern and not position data required to detect a radial position on the disk medium.

In actuality, the radial position (the position of a concentric track) is determined on the basis of the time elapsed since the head started moving from an end of the spiral servo pattern. That is, the servo self-write step adopts a method of gradually moving the head from the start position of the spiral servo pattern to place the head at a specified position and then writing the specified servo pattern to that position.

Such a method may fail to determine the radial position of the moving head if during a servo write operation, the write operation is stopped by an adverse effect, for example, a shock and then restarted.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 10A and 10B are diagrams illustrating a process of writing a spiral servo pattern to a disk medium in accordance with the present embodiment;

FIG. 11 is a diagram showing the configuration of spiral servo patterns in accordance with a second embodiment;

DETAILED DESCRIPTION

Various embodiments according to the invention will be described hereinafter with reference to the accompanying drawings. In general, according to one embodiment of the invention, there is provided a servo write method that enables the radial position of a head to be always determined when specified servo patterns are written to a disk medium on the basis of spiral servo patterns.

First Embodiment (Configuration of the Disk Drive)

Figure 1:
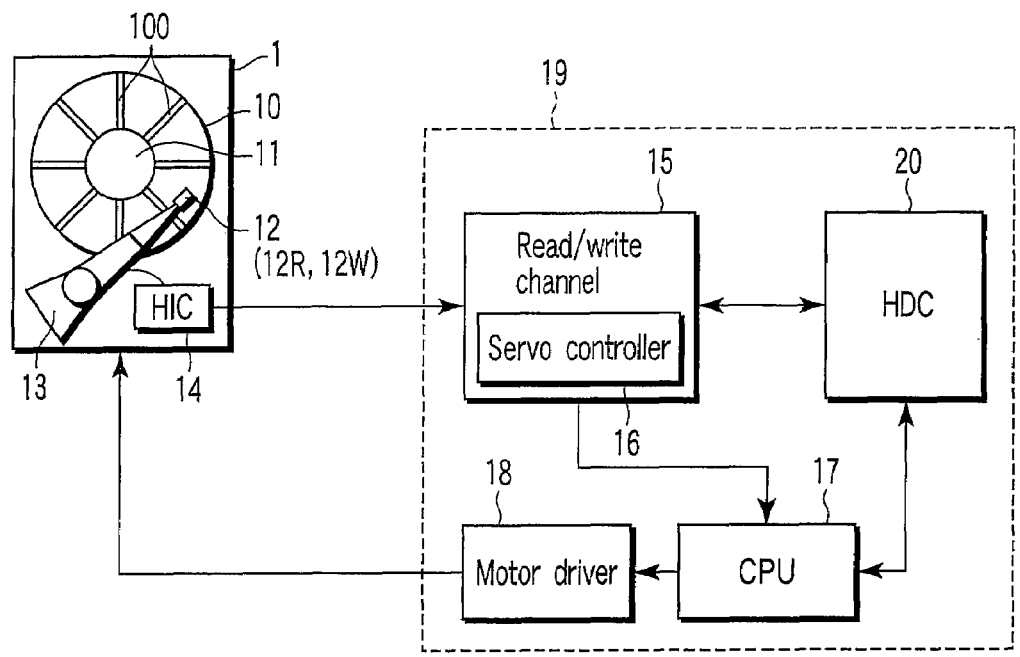
FIG. 1 is a block diagram showing an essential part of a disk drive in accordance with a first embodiment of the present invention.

According to an embodiment, FIG. 1 is a block diagram showing an essential part of a disk drive in accordance with the present embodiment.

A disk drive 1 has a disk medium 10, a spindle motor 11, a head 12, an actuator 13, a head amplifier (head IC) 14, and a printed circuit board (PCB) 19.

Figure 2:
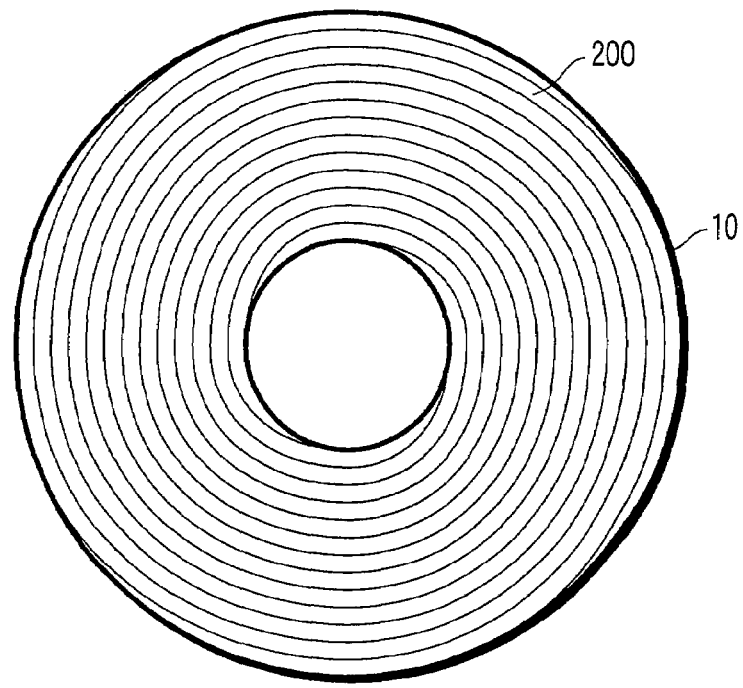
FIG. 2 is a diagram showing an example of a spiral servo pattern in accordance with the present embodiment.

The disk medium 10 is rotated at a high speed by the spindle motor 11. In the present embodiment, a spiral servo pattern 200 is recorded on the disk medium 10 as a base pattern by a servo track writer (STW) described below, as shown in FIG. 2.

The head 12 has a read head 12R and a write head 12W, and uses the read head 12R to read the spiral servo pattern 200, specified servo patterns 100, and user data from the disk medium 10. The head 12 uses the write head 12W to write user data to the disk medium 10 in data regions different from servo sectors, and writes the specified servo patterns 100 to the disk medium 10 during a servo self-write operation described below.

The actuator 13 is driven by a voice coil motor (VCM) to controllably move the mounted head 12 radially over the disk medium 10. The voice coil motor is controllably driven by a motor driver 18 mounted on PCB 19.

The head amplifier 14 amplifies read signals read by the read head 12R and outputs the amplified read signals to a read/write channel (signal processing unit) 15 mounted on PCB 19. The read signals include servo signals for the spiral servo pattern 200 and specified servo patterns 100 shown in FIG. 4.

The read/write channel 15, a microprocessor (CPU) 17, the motor driver 18, and a disk controller (HDC) 20 are mounted on PCB 19. The read/write channel 15 is a signal processing unit that processes read/write signals. The read/write channel 15 includes a servo controller 16 that executes a process of reproducing servo signals for the spiral servo pattern 200 and specified servo patterns 100.

The servo controller 16 includes an address code detector, a servo burst signal demodulator, and a servo data generator. The address code detector detects, in a read signal, address codes for a sector and a track (cylinder) contained in each of the specified servo patterns 100. The servo burst signal demodulator demodulates servo burst signals contained in the spiral servo pattern 200 and specified servo patterns 100. The servo data generator generates position error data based on the address codes detected by the address code detector and servo burst signals (A to D) and outputs the data to the CPU 17.

The motor driver 18 includes a VCM driver that supplies a drive current to the voice coil motor for the actuator 13 under the control of the CPU 17 and an SPM driver that supplies a drive current to the spindle motor 11 under the control of the CPU 17.

The HDC 20 is an interface that performs, for example, data transfers between the disk drive 1 and an external host system. The HDC 20 transfers user data output by the read/write channel 15 to the host system under the control of the CPU 17. The HDC 20 also receives data from the host system and transfers the data to the read/write channel 15. Data from the host system contains data on the specified servo patterns 100 to be written to the disk medium 10 by a servo self-write operation.

The CPU 17 is a main controller for the disk drive 1 and has a function for performing the servo self-write operation in accordance with the present embodiment. In the disk drive 1 shipped as a product, the CPU 17 controllably positions the head 12 on the basis of the specified servo patterns 100 written to the disk medium 10.

(Configuration of the Servo Track Writer)

Figure 3:
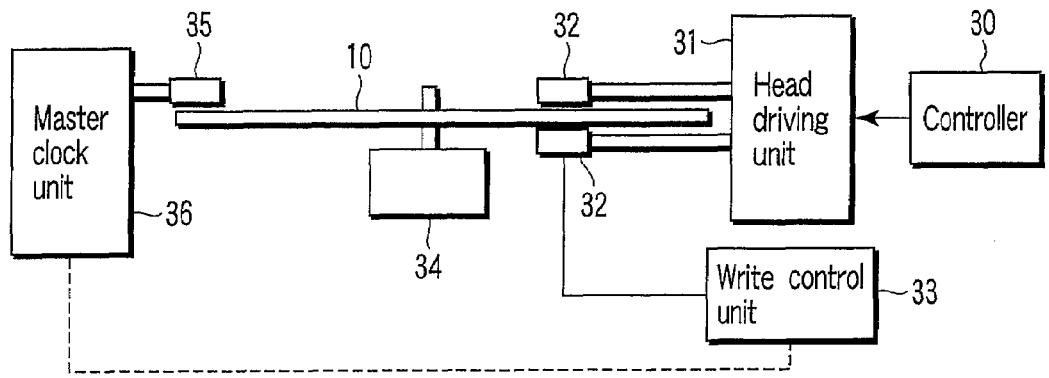
FIG. 3 is a diagram showing an essential part of a servo track writer in accordance with the present embodiment.

FIG. 3 is a block diagram showing an essential part of the servo track writer (STW) in accordance with the present embodiment.

The servo track writer (STW) is a servo write apparatus installed in a clean room to write the spiral servo pattern 200 used as base patterns, to the disk medium 1 before the servo self-write step.

As shown in FIG. 3, the servo track writer has a controller 30, a head drive unit 31, a servo head 32, a write control unit 33, a spindle motor 34, a clock head 35, and a master clock unit 36. The disk medium to which no data is written is fixed to and rotated by the spindle motor 34.

The controller 30 have a microprocessor and a memory as main elements to control the operations of the head drive unit 31, the write control unit 33, the spindle motor 34, and the master clock unit 36. The controller 30 controls the head drive unit 31 and thus the positioning of the servo head 32.

The head drive unit 31 is an actuator on which the servo head 32 is mounted and moved to a specified position on the disk medium 1. The head drive unit 31 is driven by a voice coil motor. The write control unit 33 transmits servo data used to write the spiral servo pattern 200, to the servo head 32. The servo head 32 writes the spiral servo pattern 200 to the disk medium 1 on the basis of the servo data from the write control unit 33, as shown in FIG. 2.

The master clock unit 36 transmits a clock signal to the clock head 35 under the control of the controller 30. The clock head 35 writes the clock signal to the outermost peripheral region on the disk medium 1. The controller 30 references the clock signal as a reference position information signal in order to move the servo head 32 from the innermost periphery toward outermost periphery of the disk medium 1 to position the servo head 32.

(Servo Write Operation)

Description will be given below of the servo write operation in accordance with the present invention.

The servo write method in accordance with the present embodiment uses the servo track writer shown in FIG. 3 to record the spiral servo pattern 200 on the disk medium 10 as a base pattern (seed pattern). The servo track writer writes one spiral servo pattern 200 shown in FIG. 2 from the inner periphery (ID) to outer periphery (OD) of the disk medium 10 during one full track seek operation as shown in FIG. 10A. FIG. 10B shows a process of seek control (speed control) performed on the servo head 32 by the controller 30.

Figure 6:
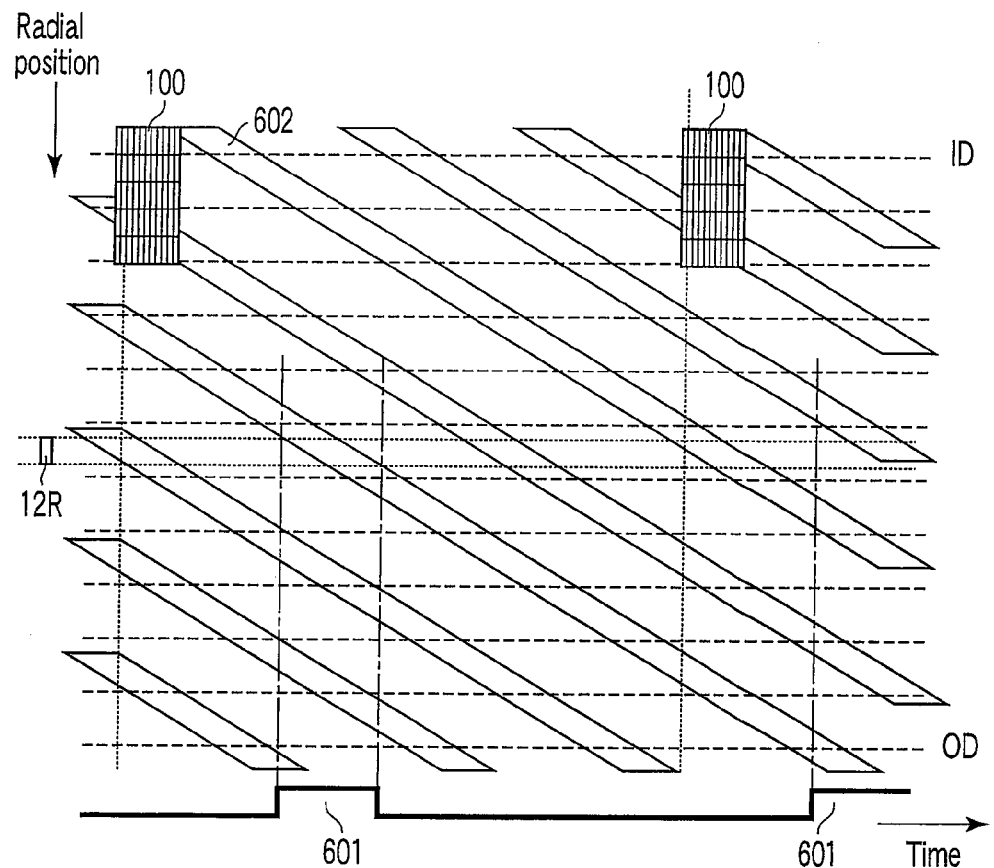
FIG. 6 is a diagram showing the configuration of the spiral servo patterns in accordance with the present embodiment.

The spiral servo pattern 200 normally has a length equal to about 10 to 20 rotations and is composed of 200 to 300 pieces. FIG. 6 shows an example of the spiral servo pattern 200 including a plurality of spiral servo patterns 602 arranged at equal intervals and parallel to one another. In FIG. 6, the abscissa indicates time, while the ordinate indicates a radial position on the disk medium 10.

Figure 7:
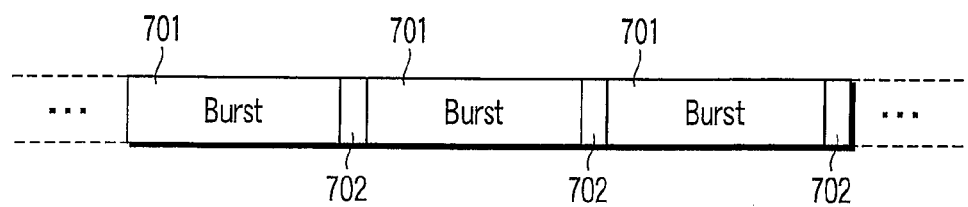
FIG. 7 is a diagram showing the format of the spiral servo pattern in accordance with the present embodiment.

As shown in FIG. 7, each of the spiral servo patterns 602 is composed as a servo burst signal 701 and a sync mark 702. Pairs each of the signals 701 and 702 are repeatedly arranged without any gap between the pairs. Besides a detection timing for the sync mark 702, position data is recorded in the servo burst signal 701 in accordance with the present embodiment to allow the radial position of the head 12 (actually the read head 12R) on the disk medium 10.

In the present embodiment, the disk medium 10 on which the plurality of spiral servo patterns 602 are recorded by the servo track writer is incorporated into the disk drive 1 to be shipped as a product. The disk drive itself performs, on the disk medium 10, a servo self-write operation of writing concentric servo patterns (specified servo patterns 100) used for the product.

In the servo self-write operation, the CPU 17 in the disk drive 1 positions the read head 12R (tracking) on the basis of the spiral servo patterns 602 as shown in FIG. 6. The CPU 17 subsequently uses the write head 12W to write the concentric specified servo patterns 100, shown in FIG. 4, to the disk medium 10.

Figure 4:
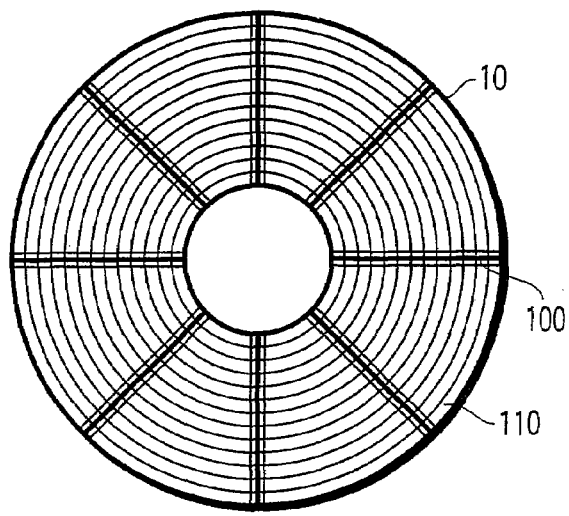
FIG. 4 is a diagram showing the configuration of concentric servo patterns in accordance with the present embodiment.
Figure 5:
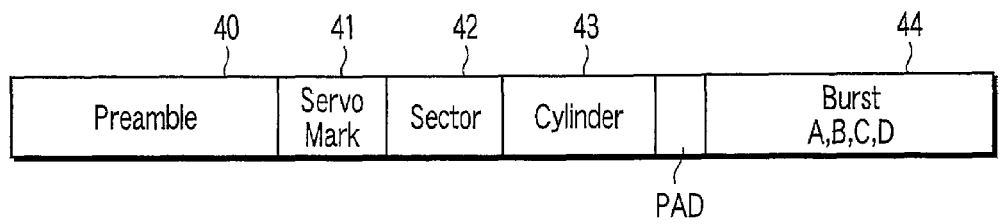
FIG. 5 is a diagram showing the configuration of a servo sector in accordance with the present embodiment.

Here, the specified servo patterns 100 are composed of servo data having such a format as shown in FIG. 5 and recorded in each servo sector. As shown in FIG. 4, the servo sectors are concentrically arranged on the disk medium 10 at predetermined circumferential intervals so as to constitute servo tracks 110.

As shown in FIG. 5, the servo sector includes a preamble 40, a servo mark 41, a sector address 42, a track (cylinder) address 43, a postamble (PAD), and servo burst signals (A, B, C, and D) 44. The sector address 42 and the track address 43 are address codes identifying the corresponding servo sector and track (cylinder), respectively. The servo burst signal 44 is a position detection signal used to detect the position of the head 12 in the track.

In the self servo operation, the CPU 17 uses the read head 12R to read the spiral servo patterns 602 recorded on the disk medium 10 to detect the position of the head 12. Specifically, as shown in FIG. 6, the CPU 17 can acquire relative position information for, for example, 10 to 20 cylinders (tracks) in accordance with the inclinations of the spiral servo patterns 602 on the basis of the position of a servo gate 601. To move the head 12 to a desired position on the disk medium 10, the CPU 17 gradually moves the head 12 toward the outer periphery of the disk medium (a seek operation) using an inner or outer peripheral fixed position, for example, an inner peripheral stopper in the drive, as a reference position.

Here, as described above, the spiral servo pattern 602 is composed of a repetition of the servo burst signal 701 and the sync mark 702 as shown in FIG. 7. The sync mark 702 can be generated by creating missing bits in the servo burst signal 701. Plural types of the sync marks 702 can be prepared by providing a plurality of missing bits.

In the present embodiment, two numerical values, a bit "0" and a bit "1", are set to be recorded in the sync mark 702. This allows the binary numerical data recorded in the sync mark 702 and made up of "0" or "1" to be embedded in the spiral servo pattern 602. In the present embodiment, the numerical data recorded in the sync mark 702 is utilized to record position data indicative of the radial position on the disk medium 10, in the spiral servo pattern 602. A specific description will be given below with reference to FIGS. 8 and 9.

Figure 8:
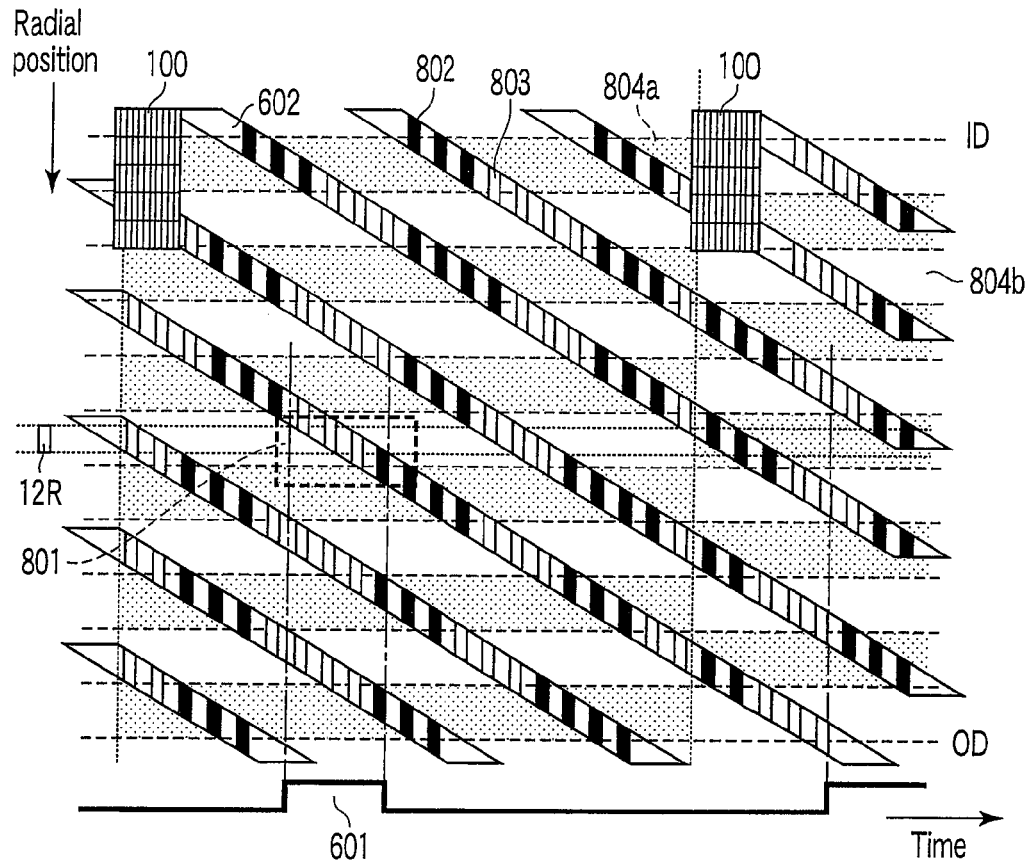
FIG. 8 is a diagram illustrating the configuration of a sync mark in accordance with the present embodiment.

As shown in FIG. 8, the spiral servo pattern 602 contains a sync mark 802 in which the numeral data "1" is recorded and a sync mark 803 in which the numeral data "0" is recorded. The numerical data can be used to encode and record the position data indicative of the radial position on the disk medium 10, in the spiral servo pattern 602.

Figure 9:
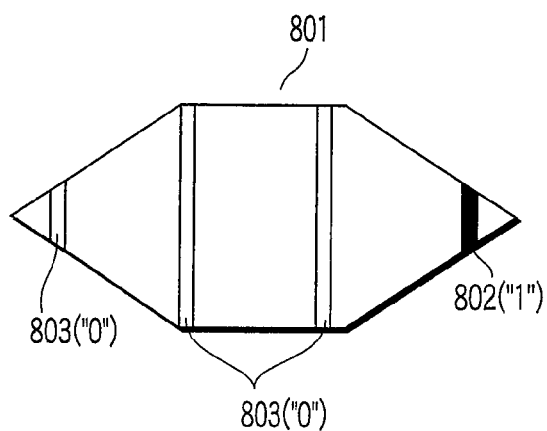
FIG. 9 is a diagram illustrating the configuration of the sync mark in accordance with the present embodiment.

The CPU 17 reads the numerical data "0" or "1" recorded in the sync marks 802 and 803 as shown in FIG. 9, from the spiral servo pattern 801 reproduced by the read head 12R, at a timing corresponding to the servo gate 601. That is, the radial position of the read head 12R can be detected by reading the position data indicative of the radial position from the spiral servo pattern 801.

In summary, with the servo write method in accordance with the present embodiment, the disk drive itself writes the specified servo patterns 100 to the disk medium while allowing the head 12 to perform a tracking operation (positioning), for example, radially from the inner periphery to outer periphery of the disk medium 10, on the basis of the spiral servo pattern 602 recorded on the disk medium 10. The specified servo patterns 100 serve to form the concentric servo tracks as shown in FIG. 8.

During the servo self-write operation, if the disk drive 1 undergoes an adverse effect, for example, a shock and the write operation is temporarily stopped and then restarted, the CPU 17 can determine the radial position of the read head 12R by reading the position data recorded in the spiral data pattern 602, from the disk medium. Specifically, the CPU 17 can determine the radial position of the read head 12R on the basis of the position data encoded on the basis of the numerical data recorded in the sync marks 802 and 803.

Thus, even if the movement of the head 12 is temporarily stopped, the CPU 17 can always detect the radial position of the head 12 to immediately restart the servo self-write operation.

In the present embodiment, the position of the servo gate 601, corresponding to the read timing for the spiral servo pattern 602, varies depending on the radial tracking position of the head 12. Consequently, the sync marks between the specified servo patterns 100, which are obtained by the servo self-write operation, may all be of the same type. Specifically, the sync mark 802 allows the specification of a radial position corresponding to a servo track 804a formed by the specified servo patterns 100. Furthermore, the sync mark 803 allows the specification of a radial position corresponding to a servo track 804b formed by the specified servo patterns 100.

The pattern 801 read by the read head 12R may contain a mixture of the two types of sync marks 802 and 803, for example, as shown in FIG. 9. However, one of the sync marks 802 and 803 can be selected on the basis of the rule of majority.

Second Embodiment

FIG. 11 is a diagram showing the configuration of spiral servo patterns in accordance with a second embodiment. In the present embodiment, a surface of the disk medium 10 is radially divided into a plurality of areas (zones). Codes enabling the respective areas to be identified are embedded in the spiral servo patterns as position data.

Specifically, the surface of the disk medium 10 is divided into 8 areas (zones) Zone1 to Zone8; the zones are arranged in this order from the inner periphery to outer periphery of the disk medium, with the area Zone1 located on the inner periphery. Numbers 1 to 8 are set for the respective areas. The numbers 1 to 8 are encoded into, for example, Gray codes, which are then recorded in the spiral servo patterns. That is, as described above, the sync marks 802 for the numerical data "1" and the sync marks 803 for the numerical data "0", contained in the spiral servo patterns 602, are combined together to obtain the Gray codes identifying the 8 areas (zones) Zone1 to Zone8. The Gray codes are then embedded in the spiral servo patterns. The position data embedded in the spiral servo patterns may be composed of binary codes instead of the Gray codes.

According to the present embodiment, in the servo self-write operation, the CPU 17 can detect the radial area (zone) in which the read head 12R is located, on the basis of the Gray codes (position data) reproduced from the spiral servo patterns 602 by the read head 12R.

Third Embodiment

Figures 12, 13:
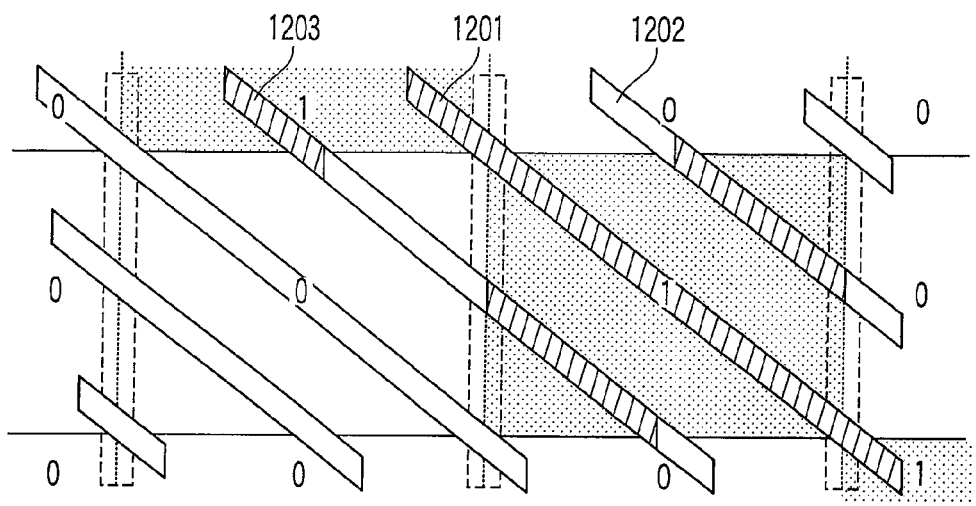
FIG. 12 is a diagram showing the configuration of spiral servo patterns in accordance with a third embodiment.
FIG. 13 is a diagram illustrating position data in accordance with the third embodiment.

FIGS. 12 and 13 are diagrams showing the configuration of spiral servo patterns in accordance with a third embodiment.

The first and second embodiments provide the method of utilizing the numerical data recorded in the sync marks to embed the position data encoded into binary numbers or Gray codes, in the spiral servo patterns. To embed any sync pattern in each of the spiral servo patterns, the method provides a complicated bit pattern sequence for the spiral servo pattern.

In contrast, the present embodiment provides a regular occurrence pattern for the sync marks to allow the position data to be embedded in the spiral servo patterns without the need to prepare any complicated bit pattern sequence.

As shown in FIG. 12, a format is assumed such that, for example, two spiral servo patterns are present between servo sectors in which the specified servo patterns 100 are recorded. A method in accordance with the present embodiment encodes the position data using, as a unit, the range within which the spiral servo pattern crosses the specified servo pattern. Within the range, the radial position of the head 12 is uniquely determined on the basis of the position of the servo gate, which is indicative of the timing at which the spiral servo pattern is to be reproduced. To allow the range to be determined, the two types of sync marks are used to express the numerical values "0" and "1".

FIG. 13 is a diagram showing bit assignments (data patterns) for the position data embedded in the spiral servo patterns. The method in accordance with the present embodiment arranges the encoded "0" and "1" areas so that only the data on a diagonal line is "1" as shown in FIG. 13. This configuration enables the determination of radial areas the number of which is the same as that of servo sectors to be subjected to the servo self-write operation. When it is assumed that the number of servo sectors is 150 and that the 1 area corresponds to 20 cylinders (tracks), the radial areas can be determined over the range of 3,000 cylinders.

In the data patterns for the sync marks shown in FIG. 13, the sync marks in a spiral servo pattern 1201 passing through the center of a "1" area all have the encoded numerical value "1". In spiral servo patterns 1202 and 1203 passing on the respective sides of the spiral servo pattern 1201, the number of sync marks traversing "0" is the same as that of sync marks traversing "1"; the sync marks traversing "0" alternate with the sync marks traversing "1". In the other spiral servo patterns, the sync marks are encoded into "0".

In short, the present embodiment provides the regular occurrence data pattern for the sync marks contained in the spiral servo patterns to allow the position data to be embedded in the spiral servo patterns without the need to prepare any complicated bit pattern sequence for each spiral servo pattern.

Fourth Embodiment

Figure 14:
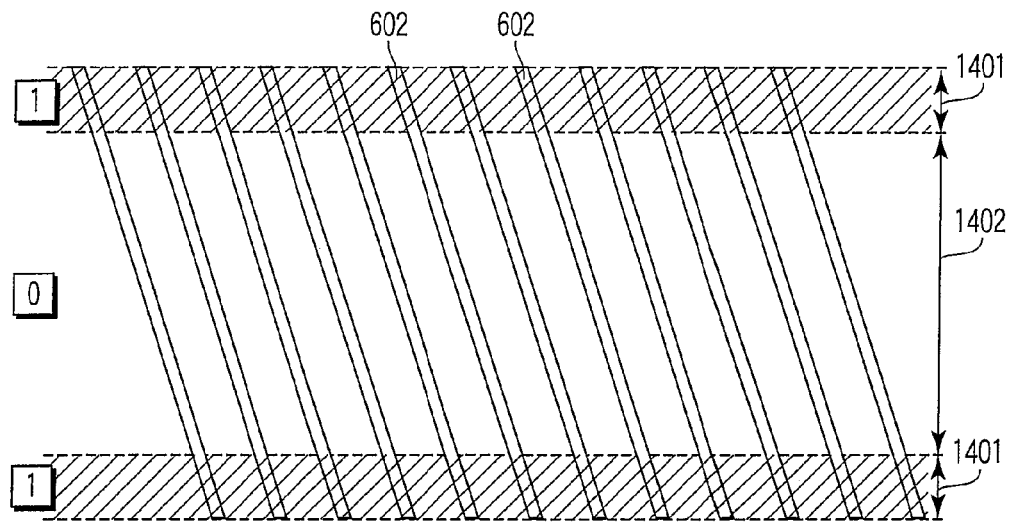
FIG. 14 is a diagram showing the configuration of spiral servo patterns in accordance with a fourth embodiment.

FIG. 14 is a diagram showing the configuration of spiral servo patterns in accordance with the fourth embodiment.

The present embodiment provides a method of specifying the range on the disk medium 10 within which the servo self-write operation writes the specified servo patterns to the disk medium 10, on the basis of the numerical data in the sync marks contained in the spiral servo patterns 602.

Specifically, as shown in FIG. 14, the numerical value "0" is recorded in all of those of the sync marks contained in the spiral servo patterns 602 which are contained in a servo write area 1402 corresponding to the range within which the specified servo patterns 100 are written to the disk medium. On the other hand, the numerical value "1" is recorded in all of the sync marks contained in a guard area 1401 that is not to be subjected to the servo write operation.

With the above method, during the servo self-write operation, the CPU 17 in the disk drive 1 can read the numerical data (position data) recorded in the sync marks in the spiral servo patterns 602 to determine whether or not the read head 12R is positioned in the servo write area 1402 corresponding to the range within which the specified servo patterns 100 are to be written to the disk medium.

This eliminates the need for a process of measuring, during the servo self-write operation, an inner peripheral position on the disk medium 10 which corresponds to a servo write start position. The present embodiment can also prevent, for example, a situation in which while moving toward the outer periphery of the disk medium 10 during the servo self-write operation, the head 12 collides against a ramp unit located on the outer periphery.

Fifth Embodiment

Figure 15:
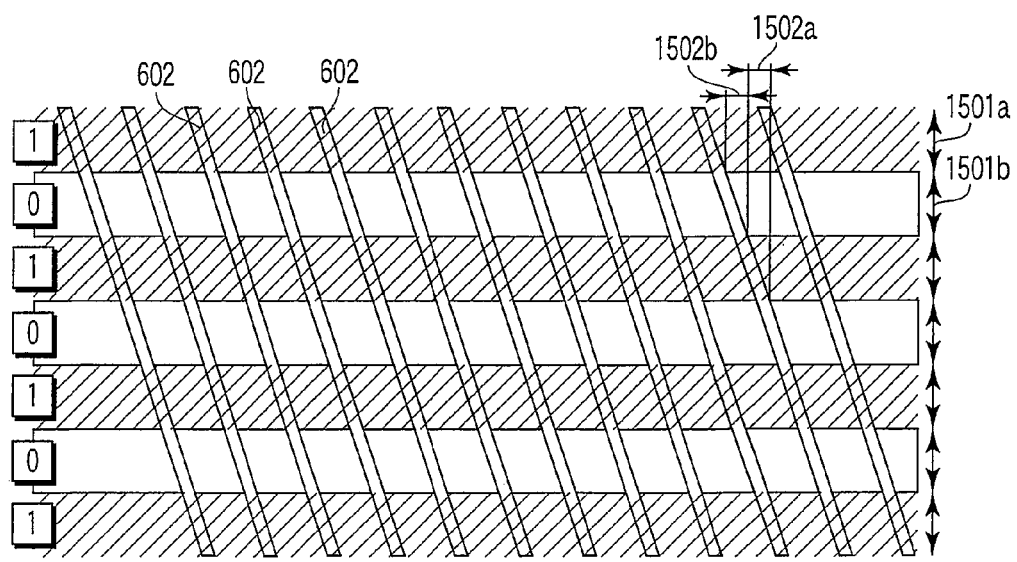
FIG. 15 is a diagram showing the configuration of spiral servo patterns in accordance with a fifth embodiment.

FIG. 15 is a diagram showing the configuration of spiral servo patterns in accordance with a fifth embodiment.

In the configuration of the spiral servo patterns according to the present embodiment, the surface of the disk medium 10 is radially divided into areas of equal width. The sync marks "1" and "0" are alternately arranged in areas 1501a and 1501b, respectively.

Specifically, when the read head 12R moves radially over the disk medium 10, the numerical data in the read sync mark switches from "0" to "1" or "1" to "0" at the boundary between the areas over which the read head 12R is passing. That is, the read head 12R reads the numerical data "1" from the sync mark upon passing through the area 1501a and reads the numerical data "0" from the sync mark upon passing through the area 1501b.

Therefore, the CPU 17 can determine the boundary between the areas over which the read head 12R is passing in accordance with a change in the numerical data from the sync mark reproduced by the read head 12R. This enables the CPU 17 to determine in which radial direction the read head 12R is moving over the disk medium 10.

Here, a circumferential moving distance on the disk medium 10 can be measured on the basis of a precisely controlled servo write clock. The possible distortion of the spiral servo patterns can also be determined by utilizing the measurement made by the clock to measure a distance 1502a, 1502b from one area boundary to the adjacent area boundary.

The embodiments make it possible to provide a servo write method allowing the radial position of the head to be always determined when the specified servo patterns 100 are written to the disk medium on the basis of the spiral servo patterns. This enables the radial position of the head to be determined even if the position of the head becomes unknown during a servo write operation.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of using a head included in a disk storage device to write specified servo patterns for head positioning control to a disk medium used for the disk storage device, a spiral servo pattern being pre-recorded on the disk medium and including a servo burst signal region and a sync mark region located adjacent to the servo burst signal region, the method comprising:

using the head to read the servo burst signal from the disk medium, when writing the specified servo patterns to the disk medium;

generating position detecting data used to detect a radial position on the disk medium, on the basis of data recorded in the sync mark region, when using the head to read the spiral servo pattern from the disk medium;

placing the head at a specified position on the disk medium on the basis of the servo burst signal and position detecting data read by the head and writing the specified servo patterns to the disk medium; and embedding data specifying a range on the disk medium within which the specified servo patterns are to be written to the disk medium, in the spiral servo pattern as the position detecting data based on the data recorded in the sync mark region.

2. The method according to claim 1, further comprising embedding the position detecting data of N-adic numbers in the spiral data pattern on the basis of N types of sync mark patterns recorded in the sync mark region.

3. The method according to claim 1, wherein the writing of the specified servo pattern to the disk medium comprises writing the specified servo patterns to the disk medium at a fixed circumferential interval so as to form concentric servo tracks.

4. The method according to claim 1, wherein the writing of the specified servo pattern to the disk medium comprises writing the specified servo patterns to the disk medium at a fixed circumferential interval so as to form concentric servo tracks, and for an area between the specified servo patterns written to the disk medium at the fixed interval, the same type of sync mark pattern is recorded in the sync mark.

5. The method according to claim 1, further comprising:
setting a plurality of areas on the disk medium by radially dividing a surface of the disk medium into the areas; and
embedding codes identifying the respective areas in the spiral servo pattern as the position detecting data.

6. The method according to claim 1, wherein the position detecting data is encoded into Gray codes.

7. The method according to claim 1, further comprising embedding the position detecting data in the spiral servo pattern by recording data providing a regular occurrence pattern in the sync mark region.

8. The method according to claim 1, further comprising:
setting a plurality of areas on the disk medium by radially dividing a surface of the disk medium into the areas; and
embedding two types of data in the spiral servo pattern as the position detecting data, one of the two types of data being recorded in the sync mark, the two types of data being alternately arranged in the areas so that the recorded data varies between the adjacent areas.

9. The method according to claim 1, further comprising:
setting a plurality of areas on the disk medium by radially dividing a surface of the disk medium into the areas, and
wherein two types of data one of which is recorded in the sync mark and which are alternately arranged in the areas so that the recorded data varies between the adjacent areas are embedded in the spiral servo pattern as the position detecting data, and
the data read from the sync mark is switched at a boundary between areas over which the head moving radially passes.

10. A method of using a head included in a disk storage device to write specified servo patterns for head positioning control to a disk medium used for the disk storage device, a spiral servo pattern being pre-recorded on the disk medium and including a servo burst signal region and a sync mark region located adjacent to the servo burst signal region, the method comprising:

using the head to read the servo burst signal from the disk medium, when writing the specified servo patterns to the disk medium;

generating position detecting data used to detect a radial position on the disk medium, on the basis of data recorded in the sync mark region, when using the head to read the spiral servo pattern from the disk medium;

placing the head at a specified position on the disk medium on the basis of the servo burst signal and position detecting data read by the head and writing the specified servo patterns to the disk medium; and determining the range on the disk medium within which the specified servo patterns are to be written to the disk medium, using the position detecting data based on the data recorded in the sync mark region.

11. The method according to claim 10, further comprising embedding the position detecting data of N-adic numbers in the spiral data pattern on the basis of N types of sync mark patterns recorded in the sync mark region.

12. The method according to claim 10, wherein the writing of the specified servo pattern to the disk medium comprises writing the specified servo patterns to the disk medium at a fixed circumferential interval so as to form concentric servo tracks.

13. The method according to claim 10, wherein the writing of the specified servo pattern to the disk medium comprises writing the specified servo patterns to the disk medium at a fixed circumferential interval so as to form concentric servo tracks, and for an area between the specified servo patterns written to the disk medium at the fixed interval, the same type of sync mark pattern is recorded in the sync mark.

14. The method according to claim 10, further comprising:
setting a plurality of areas on the disk medium by radially dividing a surface of the disk medium into the areas; and
embedding codes identifying the respective areas in the spiral servo pattern as the position detecting data.

15. The method according to claim 10, wherein the position detecting data is encoded into Gray codes.

16. The method according to claim 10, further comprising embedding the position detecting data in the spiral servo pattern by recording data providing a regular occurrence pattern in the sync mark region.

17. The method according to claim 10, further comprising:
setting a plurality of areas on the disk medium by radially dividing a surface of the disk medium into the areas; and
embedding two types of data in the spiral servo pattern as the position detecting data, one of the two types of data being recorded in the sync mark, the two types of data being alternately arranged in the areas so that the recorded data varies between the adjacent areas.

18. The method according to claim 10, further comprising:
setting a plurality of areas on the disk medium by radially dividing a surface of the disk medium into the areas, and
wherein two types of data one of which is recorded in the sync mark and which are alternately arranged in the areas so that the recorded data varies between the adjacent areas are embedded in the spiral servo pattern as the position detecting data, and
the data read from the sync mark is switched at a boundary between areas over which the head moving radially passes.

* * * * *